W. W. Wade,
Treadle.
No. 1,264. Reissued Jan. 28, 1862.
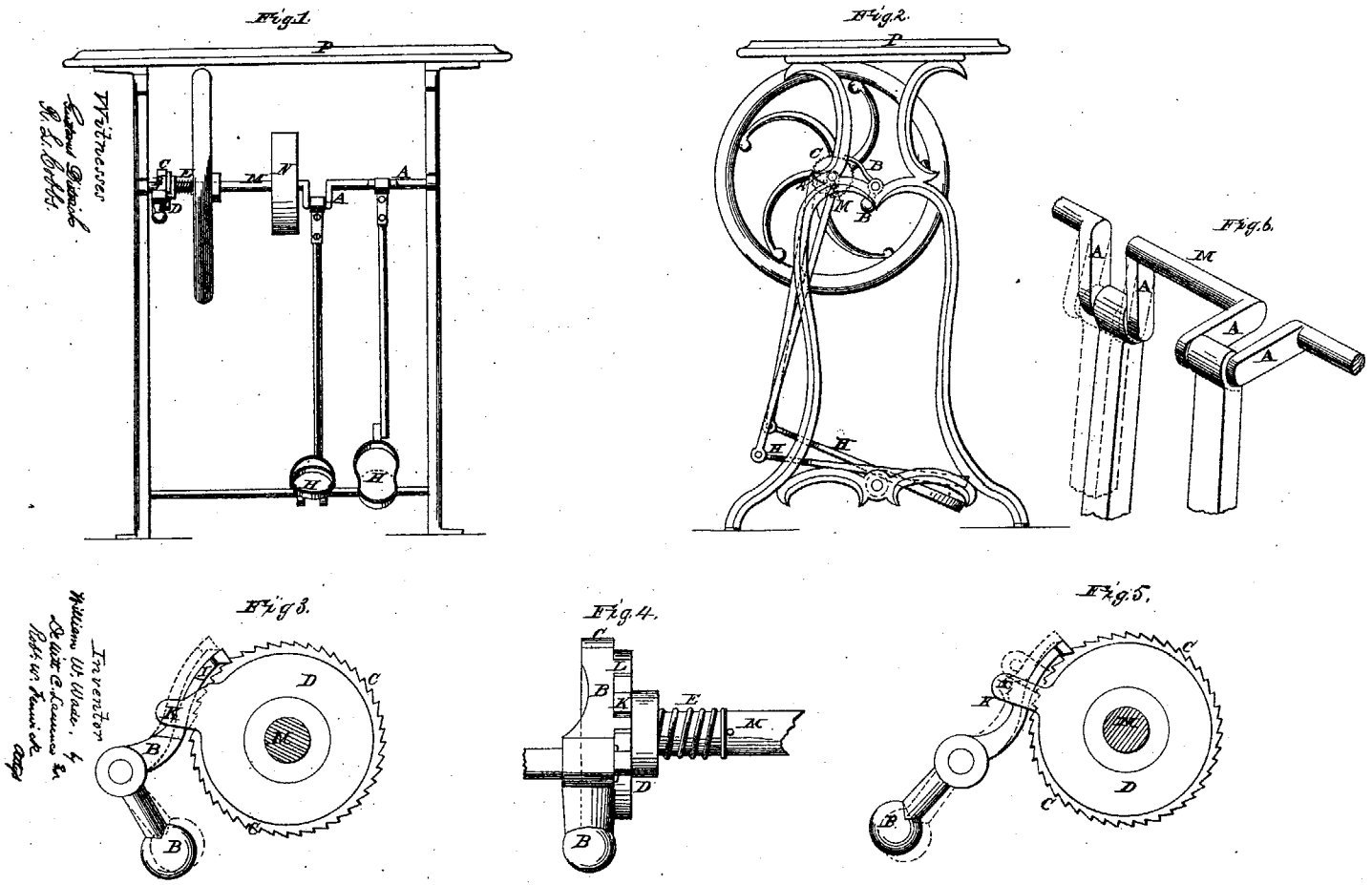
AM. PHOTO-LITHO. CO. N.Y. (OSBORNE'S PROCESS)

UNITED STATES PATENT OFFICE.

WILLIAM W. WADE, OF LONG MEADOW, MASSACHUSETTS.

IMPROVEMENT IN SEWING-MACHINES.

Specification forming part of Letters Patent No. 22,833, dated February 1, 1859; Reissue No. 1,264, dated January 28, 1862.

*To all whom it may concern:*

Be it known that I, WILLIAM W. WADE, of Long Meadow, in the county of Hampden and State of Massachusetts, have invented certain Improvements in Sewing-Machines; and I do hereby declare that the following is a full and exact description thereof, reference being had to the accompanying drawings and the letters of reference marked thereon, like letters indicating the same parts in the several figures.

The nature of my invention consists in a sewing-machine driving-shaft which has cranks working at right angles to each other, or nearly at right angles, in combination with a device which prevents a back revolution of the shaft, and with treadles by which the machine is actuated.

To enable others skilled in the art to make and use my invention, I will proceed to describe one mode of construction, by means of which my invention may be carried into practice.

In the drawings, Figure 1 is a front elevation of a sewing-machine table with a crank-shaft, M, having cranks A A set at right angles to each other, or so set as to overcome or avoid a "dead center" in the movements of the crank-shaft, and driven each by one foot of the operator by treadles H H.

N is a driving-pulley connected with the shaft M to impart motion to those parts of a sewing-machine which are to be attached to the table P, and this pulley may be situated at any convenient intermediate point between the ends of the shaft, or upon either end of the shaft.

B is a pawl; C, a ratchet or toothed wheel attached firmly to and revolving with the shaft M.

D is a friction-disk playing loosely upon the shaft M, and which depends for its motion upon being pressed against the ratchet or toothed wheel by a spring, as at E.

If, at starting, the machine inclines to go backward, it is stopped by the pawl falling into the ratchet, and when the machine starts forward the pawl is lifted from the ratchet by the inclined shelving portion of projection K, Figs. 3 and 4, coming in contact with projection L, Fig. 4, of the pawl. When the machine starts backward the disk starts back with the toothed wheel, the projection K of the disk leaving or freeing itself of the pawl, and thus allowing it to drop into the ratchet and stop the machine. When the machine starts forward the disk also starts, and moves with the toothed wheel till projection K strikes projection L, lifting the pawl above the toothed wheel, and so remain held, the one by the other, as long as the machine continues in forward motion, and until it attempts to start backward.

Fig. 2 is a side elevation of Fig. 1. Fig. 3 shows the toothed wheel with the pawl and ratchet. Fig. 4 shows the pawl B B with the friction-disk and a portion of the shaft with the spring E. Fig. 5 is the same as Fig. 3, except that it shows a pawl so balanced as to stand out from the ratchet when the machine is at rest, and when the machine starts backward the pin X in the disk presses down upon the back of the pawl, brings the end of the pawl into the ratchet and stops the machine. This is shown only as one of several modes by which the action of the pawl may be produced.

I would here state that the pawl, ratchet, and disk may be applied to many other revolving parts of a sewing-machine, instead of being applied, as in the above description, at the end of the shaft. I have shown them applied there, as being the most convenient arrangement.

By the organization which I have described it will be seen that a forward motion may be communicated to a sewing-machine from whatever point of rest its crank may start, and this without any previous manipulation or movement to start the shaft from a dead-center. In other words, there is no dead-point to be overcome in the crank-shaft preliminary to its starting, and consequently the entire forward movements of the shaft can be governed by the feet of the operator, since the feet, being used by alternate or opposite movements to communicate motion to the crank, may be controlled by the operator as opposing forces, and thus by his feet alone the operator is enabled not only to start and continue, but govern the movement of the crank-shaft with reference to any speed it may be desirable to impart to the machine.

It will also be seen that the machine can in all cases be started forward without a retrograde or backward movement, thus avoiding the breaking of the thread, loss of a stitch, the breaking of the needle, or other derangement of the work, and that it need not in any case be started forward by the hand of the operator in order to correctly commence work.

Fig. 6 is a perspective view of the crank-shaft, and showing the relation which the cranks A A may bear to the body of the shaft.

Having thus described my invention, what I claim as new, and desire to secure by Letters Patent of the United States, is—

1. A driving-shaft of a sewing-machine having cranks set at right angles to each other, or so approximating thereto as to overcome or avoid a dead-center in the movement of the shaft, substantially as and for the purpose set forth, in combination with the treadles H H, the driving-pulley N, and a device for preventing a retrograde motion of the shaft.

2. In combination with a sewing-machine driving-shaft, a ratchet device for preventing a retrograde motion when such device is caused to cease its action upon the shaft by means of friction induced between its parts by the forward revolution of the shaft, and is caused to come into action when a back thrust comes upon the shaft, constructed substantially as and for the purpose set forth.

Witness my hand this 13th day of December, A. D. 1861.

W. W. WADE.

Witnesses:
C. A. WINCHESTER,
HENRY MORRIS.